US012373955B2

(12) United States Patent
Ezrielev et al.

(10) Patent No.: US 12,373,955 B2
(45) Date of Patent: Jul. 29, 2025

(54) SYSTEM AND METHOD FOR STORAGE MANAGEMENT OF IMAGES

(71) Applicant: Dell Products L.P., Round Rock, TX (US)

(72) Inventors: Ofir Ezrielev, Be'er Sheva (IL); Amihai Savir, Newton, MA (US); Avitan Gefen, Lehavim (IL); Nicole Reineke, Northborough, MA (US)

(73) Assignee: Dell Products L.P., Round Rock, TX (US)

(*) Notice: Subject to any disclaimer, the term of this patent is extended or adjusted under 35 U.S.C. 154(b) by 275 days.

(21) Appl. No.: 17/872,865

(22) Filed: Jul. 25, 2022

(65) Prior Publication Data
US 2024/0029262 A1 Jan. 25, 2024

(51) Int. Cl.
G06T 7/11 (2017.01)
G06F 3/06 (2006.01)
(Continued)

(52) U.S. Cl.
CPC .............. *G06T 7/11* (2017.01); *G06F 3/0685* (2013.01); *G06F 16/185* (2019.01); *G06F 16/55* (2019.01); *G06T 7/0012* (2013.01); *G06T 3/40* (2013.01)

(58) Field of Classification Search
CPC .... G06T 7/00; G06T 9/00; G06T 3/40; G06T 7/11; G06T 7/0012; G06F 16/55; G06F 3/0685; G06F 16/185
See application file for complete search history.

(56) References Cited

U.S. PATENT DOCUMENTS 6,246,804 B1 6/2001 Sato et al.
8,576,238 B1 11/2013 Brandt
(Continued)

FOREIGN PATENT DOCUMENTS

WO 2008/012717 A2 1/2008
WO 2010051037 A1 5/2010
(Continued)

OTHER PUBLICATIONS

Lena Oden, Comparing Data Staging Techniques for Large Scale Brain Images, Dec. 6, 2021, IEEE, 12 pages (Year: 2021).*
(Continued)

*Primary Examiner* — Aravind K Moorthy
(74) *Attorney, Agent, or Firm* — WOMBLE BOND DICKINSON (US) LLP

(57) ABSTRACT

Methods and systems for managing storage of data are disclosed. To manage storage of data, images may be stored across a number of storages that provide varying levels of storage performance and have correspondingly varying costs for storing data. To store the images across the storages, the images may be segmented into image segments and a likelihood of each of the image segments being used in the future may be identified. The image segments that are more likely to be used in the future may be stored in higher performance storages while the image segments that are less likely to be used in the future may be stored in lower performance storages. To identify the likelihood of each of the image segments being used in the future, the image segments may be classified based on their membership in one or more areas of interest within the images.

20 Claims, 10 Drawing Sheets

(51) Int. Cl.
*G06F 16/185* (2019.01)
*G06F 16/55* (2019.01)
*G06T 3/40* (2024.01)
*G06T 7/00* (2017.01)

(56) References Cited

U.S. PATENT DOCUMENTS

| | | | |
|---|---|---|---|
| 8,600,143 B1* | 12/2013 | Kulkarni | G06V 10/7625 |
| | | | 382/133 |
| 8,862,741 B1 | 10/2014 | Tegtmeier | |
| 8,873,836 B1* | 10/2014 | Dietrich | G06F 18/24 |
| | | | 382/155 |
| 8,935,474 B1* | 1/2015 | Todd | G06F 12/08 |
| | | | 711/117 |
| 9,324,145 B1* | 4/2016 | Cherevatsky | A61B 1/000094 |
| 9,665,799 B1 | 5/2017 | Munteanu | |
| 10,109,051 B1* | 10/2018 | Natesh | G06V 20/10 |
| 11,393,575 B1* | 7/2022 | Ceballos Lentini | G16H 50/20 |
| 11,948,687 B2* | 4/2024 | Jaber | G06N 3/0464 |
| 12,144,551 B1* | 11/2024 | Farley | A61B 90/39 |
| 2001/0030667 A1 | 10/2001 | Kelts | |
| 2004/0100476 A1* | 5/2004 | Morita | H04N 7/18 |
| | | | 345/619 |
| 2004/0101176 A1* | 5/2004 | Mendonca | G06T 7/0012 |
| | | | 382/199 |
| 2004/0117358 A1 | 6/2004 | Von Kaenel et al. | |
| 2006/0112334 A1 | 5/2006 | Endrikhovski | |
| 2006/0159367 A1* | 7/2006 | Zeineh | G02B 21/365 |
| | | | 382/128 |
| 2007/0064981 A1 | 3/2007 | Meijer | |
| 2007/0160274 A1* | 7/2007 | Mashiach | G06V 10/267 |
| | | | 382/128 |
| 2007/0263915 A1* | 11/2007 | Mashiach | G06V 10/267 |
| | | | 382/130 |
| 2008/0184068 A1 | 7/2008 | Mogi | |
| 2008/0242968 A1 | 10/2008 | Claus | |
| 2009/0074275 A1* | 3/2009 | O Ruanaidh | G06V 20/695 |
| | | | 382/302 |
| 2009/0210427 A1 | 8/2009 | Eidler | |
| 2009/0290811 A1* | 11/2009 | Imai | G06T 7/11 |
| | | | 382/285 |
| 2011/0002555 A1* | 1/2011 | Sodagar | G06T 7/11 |
| | | | 382/266 |
| 2011/0110568 A1 | 5/2011 | Vesper | |
| 2013/0022251 A1* | 1/2013 | Chen | G06T 3/06 |
| | | | 382/131 |
| 2013/0162664 A1 | 6/2013 | Peacock | |
| 2014/0002466 A1 | 1/2014 | Paragios | |
| 2015/0030231 A1* | 1/2015 | Porikli | G06T 7/162 |
| | | | 382/173 |
| 2015/0073909 A1 | 3/2015 | Peden | |
| 2015/0134661 A1 | 5/2015 | Circlaeys | |
| 2015/0278249 A1 | 10/2015 | Akiyama et al. | |
| 2015/0332111 A1* | 11/2015 | Kisilev | G06T 7/0012 |
| | | | 382/131 |
| 2016/0062689 A1* | 3/2016 | Cherubini | G06F 3/0608 |
| | | | 711/159 |
| 2016/0284103 A1* | 9/2016 | Huang | A61B 3/102 |
| 2017/0249744 A1* | 8/2017 | Wang | G06T 1/60 |
| 2017/0273651 A1* | 9/2017 | Behrooz | A61B 6/505 |
| 2018/0245979 A1* | 8/2018 | Park | G01J 3/50 |
| 2018/0276815 A1* | 9/2018 | Xu | G06V 10/987 |
| 2018/0315193 A1* | 11/2018 | Paschalakis | A61B 3/12 |
| 2019/0011703 A1 | 1/2019 | Robaina | |
| 2019/0244346 A1* | 8/2019 | Schafer | G06T 7/0012 |
| 2019/0333197 A1* | 10/2019 | Kask | G06T 5/40 |
| 2020/0043600 A1* | 2/2020 | Glottmann | G16H 15/00 |
| 2020/0092571 A1* | 3/2020 | Tourapis | G09G 5/14 |
| 2020/0143171 A1* | 5/2020 | Lee | G06V 20/49 |
| 2020/0175324 A1* | 6/2020 | Takahashi | G06V 10/809 |
| 2020/0184252 A1* | 6/2020 | Syeda-Mahmood | G06V 10/26 |
| 2020/0193608 A1* | 6/2020 | Sato | G06V 20/46 |
| 2020/0193609 A1* | 6/2020 | Dharur | G06T 7/143 |
| 2020/0234451 A1 | 7/2020 | Holzer | |
| 2020/0285880 A1* | 9/2020 | Sedai | G06T 7/0012 |
| 2020/0342595 A1* | 10/2020 | Jia | G06T 7/0012 |
| 2020/0372718 A1 | 11/2020 | Molyneaux | |
| 2020/0373013 A1* | 11/2020 | Cao | G06T 7/0014 |
| 2020/0410669 A1* | 12/2020 | Psota | G06T 7/0012 |
| 2020/0411164 A1 | 12/2020 | Donner | |
| 2021/0035342 A1* | 2/2021 | Glaser | G06V 20/52 |
| 2021/0068778 A1* | 3/2021 | Morley | A61B 8/469 |
| 2021/0073449 A1 | 3/2021 | Segev | |
| 2021/0090261 A1* | 3/2021 | Sugimoto | G16H 50/50 |
| 2021/0142559 A1* | 5/2021 | Yousefhussien | |
| | | | G06Q 10/06315 |
| 2021/0150682 A1 | 5/2021 | Sytnik | |
| 2021/0209488 A1 | 7/2021 | Li | |
| 2021/0223150 A1* | 7/2021 | Yoon | G01N 3/58 |
| 2021/0233213 A1 | 7/2021 | Mejjati | |
| 2021/0295528 A1* | 9/2021 | Fuchs | G06V 10/751 |
| 2021/0345955 A1* | 11/2021 | Jones | A61B 5/6898 |
| 2021/0366145 A1* | 11/2021 | Yamamoto | G06T 7/11 |
| 2021/0374965 A1* | 12/2021 | Richter | G06N 3/08 |
| 2021/0383242 A1 | 12/2021 | Ostyakov | |
| 2021/0383535 A1* | 12/2021 | Li | G06V 20/188 |
| 2022/0076411 A1* | 3/2022 | Georgescu | G06V 10/82 |
| 2022/0091259 A1* | 3/2022 | Hucks | G06T 1/20 |
| 2022/0101533 A1* | 3/2022 | Hufford | G06T 7/593 |
| 2022/0116549 A1 | 4/2022 | Neofytou | |
| 2022/0138931 A1* | 5/2022 | Palma | G06T 7/174 |
| | | | 382/128 |
| 2022/0138933 A1* | 5/2022 | Wang | G06T 7/174 |
| | | | 382/128 |
| 2022/0139531 A1* | 5/2022 | Wang | G16H 50/20 |
| | | | 382/128 |
| 2022/0147768 A1* | 5/2022 | Thermos | G06V 10/82 |
| 2022/0157063 A1* | 5/2022 | Bronicki | G06T 7/0004 |
| 2022/0172464 A1* | 6/2022 | Ross | G05D 1/0044 |
| 2022/0284118 A1 | 9/2022 | Kaul | |
| 2022/0284570 A1* | 9/2022 | Tan | G06T 15/08 |
| 2022/0318995 A1* | 10/2022 | Chen | G16H 50/20 |
| 2022/0343493 A1* | 10/2022 | Katekari | G02B 27/017 |
| 2022/0354356 A1* | 11/2022 | Weeks | G06T 7/0012 |
| 2022/0358775 A1* | 11/2022 | Hantehzadeh | G06T 3/18 |
| 2022/0391615 A1* | 12/2022 | Machefer | G06V 30/194 |
| 2023/0051436 A1* | 2/2023 | Ahmad | G16H 50/70 |
| 2023/0069310 A1* | 3/2023 | Myronenko | G06T 7/11 |
| 2023/0206447 A1 | 6/2023 | Kobayashi et al. | |
| 2023/0252638 A1* | 8/2023 | Hotson | G06V 10/7747 |
| | | | 382/157 |
| 2023/0329607 A1* | 10/2023 | Huttunen | G06Q 30/0242 |
| 2023/0340759 A1* | 10/2023 | Bruflodt | G05D 1/0038 |
| 2024/0029241 A1* | 1/2024 | Ezrielev | G06T 5/50 |
| 2024/0029242 A1* | 1/2024 | Ezrielev | G06T 7/0012 |
| 2024/0029263 A1* | 1/2024 | Ezrielev | G06N 5/04 |
| 2024/0249415 A1* | 7/2024 | Aslan | G16H 20/00 |

FOREIGN PATENT DOCUMENTS

| | | |
|---|---|---|
| WO | 2015015341 A1 | 2/2015 |
| WO | 2017213244 A1 | 12/2017 |
| WO | 2022/064409 A1 | 3/2022 |
| WO | 2022070528 A1 | 4/2022 |

OTHER PUBLICATIONS

Goodfellow, Ian J., et al. "Generative Adversarial Nets", Departement d'informatique et de recherche operationnelle, Universite de Montreal, Montreal, QC H3C 3J7, Canada. arXiv:1406.2661v1 [stat.ML] Jun. 10, 2014. 9 pages.

Radford, Alec, et al. "Unsupervised Representation Learning with Deep Convolutional Generative Adversarial Networks", indico Research, Boston, MA. Under review as a conference paper at ICLR 2016. arXiv:1511.06434v2 [cs.LG] Jan. 7, 2016. 16 pages.

Goodfellow, Ian, "NIPS 2016 Tutorial: Generative Adversarial Networks", OpenAI. arXiv:1701.00160v4 [cs.LG] Apr. 3, 2017. 57 pages.

Allwardt, Vanessa, et al. "Translational Roadmap for the Organs-on-a-Chip Industry toward Broad Adoption", Bioengineering 2020, 7, 112; Sep. 16, 2020. 27 pages.

(56) References Cited

OTHER PUBLICATIONS

Kilic, Tugba, et al. "Organs-on-chip monitoring: sensors and other strategies", Microphysiological Systems, 2018; 2:5; Sep. 5, 2018. 32 pages.
"Causal Discovery from Spatio-Temporal Data with Applications to Climate Science", Ebert-Uphoff, Imme, School of Electrical and Computer Engineering, Colorado State University, Fort Collins, CO; and Deng, Yi, School of Earth and Atmospheric Sciences, Georgia Institute of Technology, Atlanta, GA. Dec. 2014. 8 pages.
ZEN Microscopy Software, "Your Complete Solution from Sample to Knowledge", Zeiss; Carl Zeiss Microscopy GmbH, 07745 Jena, Germany. Jul. 2021. 28 pages.
ZEN Data Storage and Data Explorer, "Smart data management in life sciences", Zeiss; updated: Oct. 2020; Carl Zeiss Microscopy GmbH, 07745 Jena, Germany; Oct. 2020. 4 pages.
Torfi, Amirsina, et al. "Differentially Private Synthetic Medical Data Generation using Convolutional GANs", arXiv Submission Version. arXiv:2012.11774v1 [cs.LG] Dec. 22, 2020. 13 pages.
Vignesh Raghunath et al., "Mouse cursor movement and eye tracking data as an indicator of pathologists' attention when viewing digital whole slide images", J Pathol Inform, 2012, vol. 3, No. 43 (8 pages).

\* cited by examiner

SYSTEM AND METHOD FOR STORAGE MANAGEMENT OF IMAGES

FIELD

Embodiments disclosed herein relate generally to data storage. More particularly, embodiments disclosed herein relate to systems and methods to manage the storage of images.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
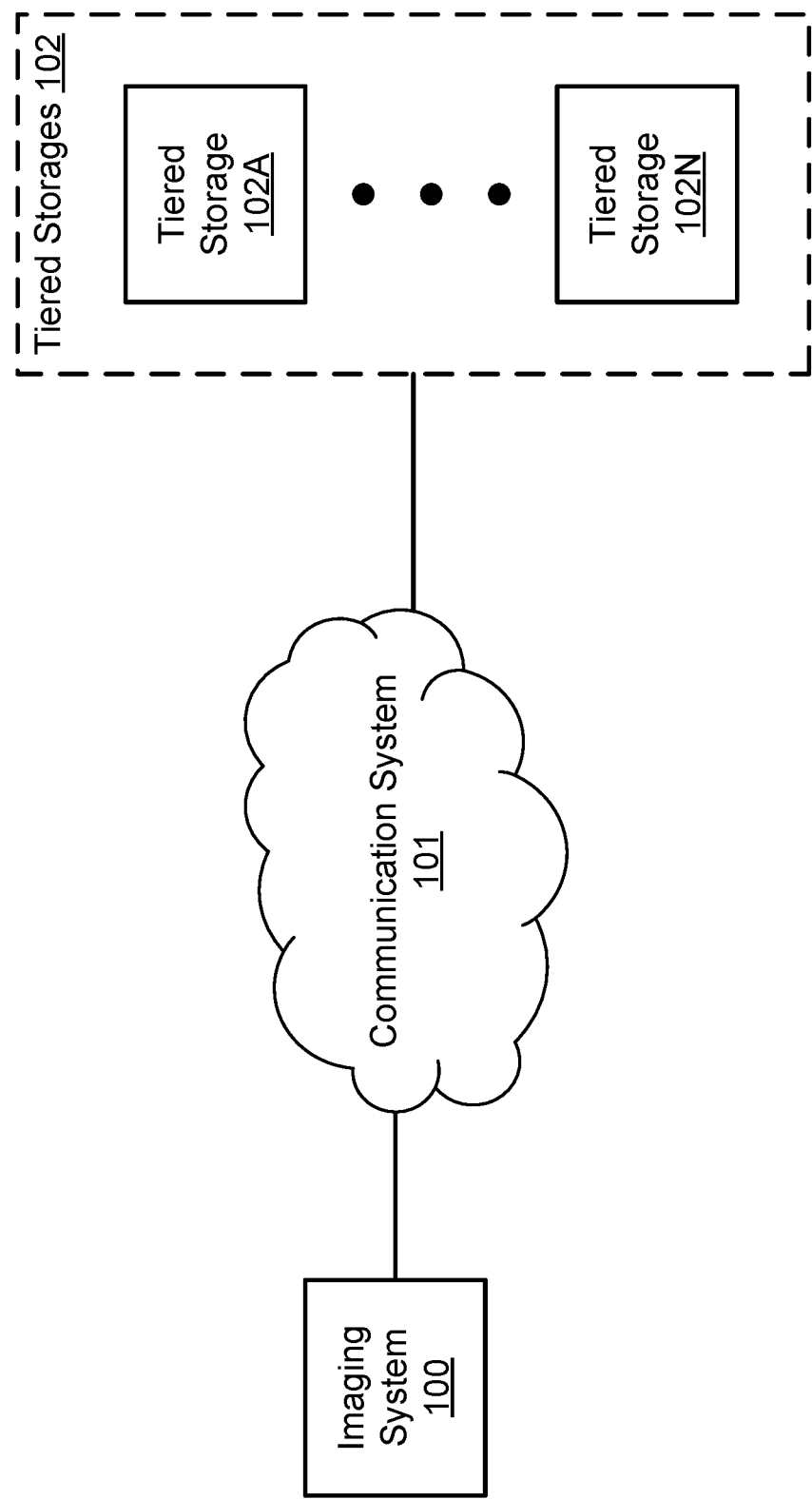
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing storage of data. To manage storage of data, images may be stored across a number of storages that provide varying levels of storage performance and have correspondingly varying costs for storing data. To store the images across the storages, the images may be segmented into image segments and a likelihood of each of the image segments being used in the future may be identified. The image segments that are more likely to be used in the future may be stored in higher performance storages while the image segments that are less likely to be used in the future may be stored in lower performance storages.

To identify the likelihood of each of the image segments being used in the future, the image segments may be classified based on their membership in one or more areas of interest within the images. The areas of interest may indicate portions of an image that are of varying levels of relevancy to an outcome that was achieved using the image. For example, for a given image, some of the image may include important information relevant to a diagnosis or identification of other condition while other portions of the image may include little or no relevant information. The likelihood of each of the image segments being used in the future may be inferred based on the informational content of the images used in past processes and/or related to previously achieved outcomes, such as medical diagnosis based on the image.

By doing so, embodiments disclosed herein may provide a system that may preferentially store portions of images that are more likely to be used in higher performance but more costly storage while the portions of images that are less likely to be used in the future may be preferentially stored in lower performance but more cost efficient storages.

In additional to selecting storages for storing images, the resolution of the stored image segments (e.g., reduced from that of the image) may also be decided based on the likelihood of each of the image segments being used in the future. For example, image segments that are less likely to be used in the future may be stored in both lower performance storage and with lower levels of fidelity (e.g., reduce resolution) than the native image. Consequently, the cost and resources expended for storing images may be further reduced.

In an embodiment, a method for managing storage of images in different storage tiers is provided. The method may include obtaining an image of the images; identifying areas of interest in the image; segmenting the image into segments to obtain image segments; classifying the image segments based on the areas of interest in the image to obtain image segment classifications corresponding to the image segments; obtaining a storage tier allocation for each of the image segments on a corresponding image segment classification of the image segment classifications to obtain storage tier allocations; and for each of the image segments, storing the image segment in a storage of a storage tier of the storage tiers, the storage tier of the storage tiers being based on a storage tier allocation of the storage tier allocations associated with the image.

Each of the areas of interest in the image may define a group of pixels of the image that are diagnostically relevant to a medical condition. Each of the areas of interest in the image may be identified as part of a medical investigation into the medical condition, the medical investigation being performed by a subject matter expert. The subject matter expert may be an inference model or a medical professional.

Storing the image segment in the storage may include identifying an image fidelity level associated with the storage tier of the storage tiers; conforming the image segment to the image fidelity level to obtain a conformed image segment; and storing the conformed image segment in the storage. The image segments may be conformed by downscaling the resolution of the image segments to meet the fidelity level, which may specify an image resolution standard for image segments. Each of the storage tiers may have an associated image fidelity level.

Classifying the image segments may include, for an image segment of the image segments: calculating an interest level for the image segment based on the areas of interest. For example, the interest level may reflect the likelihood that the image segment may be used in the future. Calculating the interest level may include, for each pixel of the image segment, selecting a weight for the pixel based on membership of the pixel in the areas of interest; and summing the weight for each pixel in the image segment to obtain the interest level. Different weights may be associated with the areas of interest, and the weights may be based on types of the areas of interest. The types of the areas of interest may define the position of each of the areas of interest in a hierarchy. The types of the areas of interest may indicate levels of relevancy of corresponding portions of the image to a medical diagnosis made using the image.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize images as part of the provided computer-implemented services.

The images may include, for example, super resolution images or other types of images of large size (and/or other sizes). The images may depict various types of scenes which may be useful for a range of purposes. For example, the images may depict scenes useful for medical diagnosis, accident analysis, surveying, and/or other types of purposes.

The computer-implemented services may include any type and quantity of computer-implemented services. The computer-implemented services may include, for example, (i) data storage services for storing and providing copies of the images over time, (ii) analysis services through which the images may be analyzed and information derived from the images may be obtained, and/or (iii) any other type of computer-implemented services that may be performed, at least in part, using images (e.g., image files).

To facilitate use of the images as part of the computer-implemented services, the images may be stored in non-transitory storage for long term retention and/or in memory during use in the computer-implemented services. Due to the size of the images, performance of data processing systems may be less desirable than that desired for the computer-implemented services due to consumption of computing resources for use of the images in the computer-implemented services.

In general, embodiments disclosed herein may provide methods, systems, and/or devices for managing storage and/or use of images to facilitate performance of desired computer-implemented services. To manage storage and use of the images, (i) the images may be segmented, (ii) a likelihood of future access of each image segment may be identified, (iii) the image segment may be allocated for different storage tiers depending on the likelihood of future access of each image segment, and (iv) the image segments may be stored in storages of varying storage tiers based on the allocation for each respective image segment so that image segments that are more likely to be accessed in the future are stored in higher performance storage tiers and image segments that are less likely to be accessed in the future are stored in lower performance storage tiers. By doing so, embodiments disclosed herein may provide a more responsive system by improving the efficiency of resource allocation for accessing images while limiting cost incurred for responsiveness of the system.

To obtain, segment, and/otherwise process the images, the system of FIG. 1 may include imaging system 100. Imaging system may obtain images and store the images (and/or portions thereof) in storages (e.g., tiered storages 102) based on the likelihood of future access of each image and/or portions thereof.

To ascertain the likelihood of future access of each segment of an image, imaging system 100 may identify areas of interest in each image. These areas of interest may be identified (i) through computer automation such as use of an inference model and/or (ii) in cooperation with a person that may be a subject matter expert (the inference model may be treated as a subject expert in automated approaches).

Through computer automation, the inference model may take an image as input and identify areas of the image that may be useful for various purposes (e.g., medical diagnosis, crash site analysis, security threat identification, etc.). For example, the inference model may (i) identify areas of an image relevant to a medical diagnosis and annotate the image accordingly (e.g., via separate metadata or addition of information to the image file), and (ii) establish a medical diagnosis based on the identified areas of the image. The identified areas of the image may be treated as the areas of interest. The inference model may be implemented, for example, with a trained machine learning model or other type of automated method for identifying areas of interest and/or using the areas of interest for various purposes. For example, an inference model may receive an image as input and output a medical diagnosis or other classification for the image.

Through cooperation with a subject matter expert, the subject matter expert may (i) identify areas of an image relevant to a medical diagnosis (or other purpose) and annotate the image accordingly (e.g., via separate metadata or addition of information to the image) through a data processing system (which may be part of or separate from imaging system 100), and (ii) establish a medical diagnosis (or other outcome) based on the identified areas of the image. The identified areas of the image may be treated as the areas of interest. To cooperate with the subject matter expert, the subject matter expert may provide user input to a data processing system (which may be part of or separate from imaging system 100). The user input may indicate portions of the image corresponding to the areas of interest, and/or information regarding the areas of interest such as types of the areas of interest within a hierarchy. The user input may be used to establish the areas of interest.

For example, the image may be presented to the subject matter expert on a display and the subject matter expert may use a mouse or other type of input device to designate portions of the image as areas of interest, which may be designated as being at various levels in a hierarchy of the areas of interest.

While described with respect to medical diagnosis, it will be appreciated that the areas of interest identified through automated or cooperative approaches may be used to achieve other types of goals.

The areas of interest of the images may be treated as being likely to be accessed in the future. Accordingly, the likelihood of access of the image segments may calculated based on each image segment's membership in one or more areas of interest. An image segment may be a member of an area of interest if any of the image segment is coextensive with the area of interest.

For example, if an image segment includes a portion of the image that is within an area of interest, the image segment may be treated as having a high likelihood (or another level of likelihood depending on the level of area of interest in a hierarchy) of being accessed in the future. In another example, if an image segment is not within any areas of interest, the image segment may be treated as having a low likelihood of being accessed in the future. In a still further example, if an image segment is partially within an area of interest (e.g., straddles a boundary of an area of interest), then the image segment may be treated as having a medium likelihood of being accessed in the future. Other criteria may be used to ascertain the level of likelihood of an image segment being accessed in the future may be used without departing from embodiments disclosed herein.

In additional to area of interest membership, the likelihood of an image segment being accessed in the future may also take into account a type of an area of interest. For example, when an image is processed different types of areas of interest may be identified. The types of the area of interest may define a hierarchy with respect to the areas of interest. The hierarchy may define a level of relevancy of each type of area of interest with respect to a purpose (e.g., a medical diagnosis) for which the image is annotated with the areas of interest.

To identify the likelihood of an image segment being accessed in the future, different types of areas of interest may be associated with different weights corresponding to the location of each area of interest within the hierarchy. When an image segment is identified as having membership in an area of interest, the weight for that area of interest may be taken into account.

For example, if an image segment is within an area of interest that is at a top of the hierarchy, the image segment may be treated as having a high likelihood of being accessed in the future. In another example, if an image segment is within an areas of interest that is at a bottom of the hierarchy, the image segment may be treated as having a low likelihood of being accessed in the future.

In an embodiment, the likelihood of an image segment being accessed in the future is quantified using an objective function that takes into account (i) the image segment's membership in one or more areas of interest, (ii) the positions of the one or more areas of interest in a hierarchy, and (iii) the quantity of the image segment that is within each area of interest. For example, the objective function may sum (i) each portion of the image segment within an area of interest, (ii) multiplied by a size of the portion of the image, (iii) multiplied by a weight corresponding to the position of the area of interest in the hierarchy. For example, consider an example image segment that includes three portions. The first portion is within an area of interest designated as having a high relevancy, the second portion is within an area of interest designated as having a low relevancy, and the third portion is outside of any areas of interest. In this example, the likelihood of image segment being access in the future may be calculated by (i) multiplying a size (e.g., area) of the first portion by a weight corresponding to high relevancy within a relevancy hierarchy, (ii) multiplying a size (e.g., area) of the second portion by a weight corresponding to low relevancy within the relevancy hierarchy to obtain a second intermediate calculation result, (iii) treating the third portion as have no value, and (iv) summing the first intermediate result and the second intermediate result.

In an embodiment, the likelihood of an image segment being accessed in the future is quantified based the highest ranked area of interest in a hierarchy and to for which any portion of the image segment is a member. For example, if an image segment includes two portions one of which is a member of a highly ranked area of interest and the other being a member in a low ranked area of interest, the image segment may be quantified based only on its partial membership in the highly ranked area of interest.

In an embodiment, the likelihood of an image segment being accessed in the future is quantified based the lowest ranked area of interest in a hierarchy and for which any portion of the image segment is a member. For example, if an image segment includes two portions one of which is a member of a highly ranked area of interest and the other being a member in a low ranked area of interest, the image segment may be quantified based only on its partial membership in the low ranked area of interest.

To allocate the image segments for storage, imaging system 100 may perform a lookup to identify a storage plan or may otherwise identify a storage plan (e.g., based on an association) for an image segment based on the likelihood of the image segment being accessed in the future. The storage plan may specify (i) a storage tier, (ii) a migration plan between storage tiers (e.g., transferring image segments between tiered storages at different points in time), (iii) a fidelity level (e.g., resolution) for an image segment, and/or (iv) other information that defines how an image segment will be stored for future use. The storage plan may define the allocation for the image segment.

Once allocated, imaging system 100 may store the image segments in corresponding tiered storages of tiered storages 102, put in place migration plans Tiered storages 102 may store image segments and/or other data structures. Tiered storages 102 may include any number of tiered storages (e.g., 102A, 102N). Different tiered storages may provide different quality levels with respect to storing data and/or providing copies of stored data. For example, different tiered storages may be implemented with different types and/or quantities of hardware devices. Consequently, different storage tiers may be more or less costly to implement depending on hardware/software components used to implement the storage tiers. To manage cost, tiered storages 102 may include tiered storages with different levels of performance and associated cost. Accordingly, imaging system 100 may store image segments that are more likely to be accessed in the future in higher performance storage tiers (which may have higher associated costs) and other image segments that are less likely to be accessed in the future in lower performance storage tiers.

In an embodiment, tiered storages 102 is implemented with a range of different storage tiers providing different levels of performance having corresponding levels of associated cost. Thus, the image segments may be distributed to the different storage tiers based on corresponding likelihoods of future access.

In an embodiment, tiered storages 102 is implemented with two storage tiers that provide different levels of performance having corresponding levels of associated cost. The image segments associated with areas of interest may be stored in a higher performance tiered storage and the image segments not associated with areas of interest may be stored in lower performance tiered storage.

Figure 3:
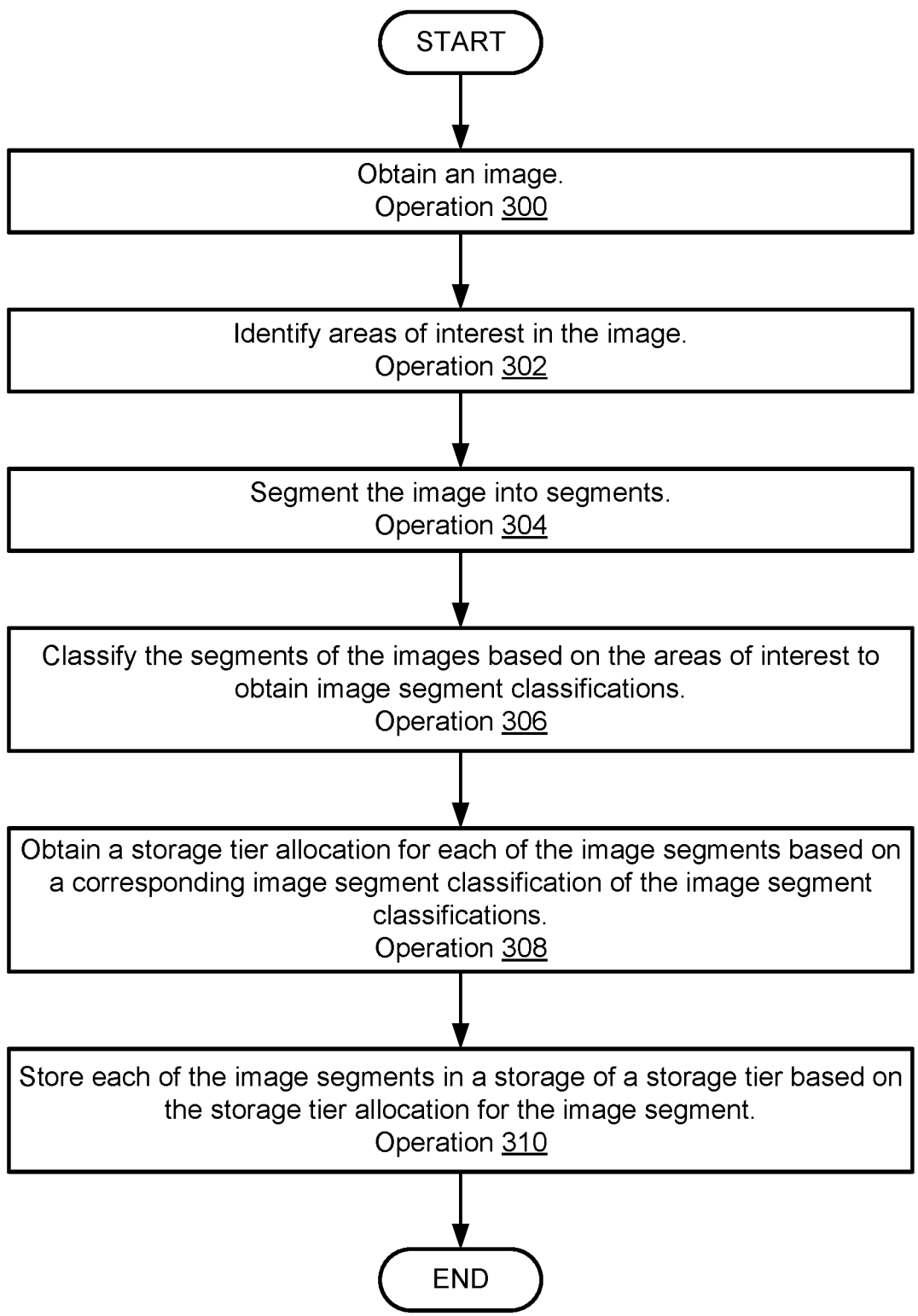
FIG. 3 shows a flow diagram illustrating a method of storing an image in accordance with an embodiment.
Figure 4A:
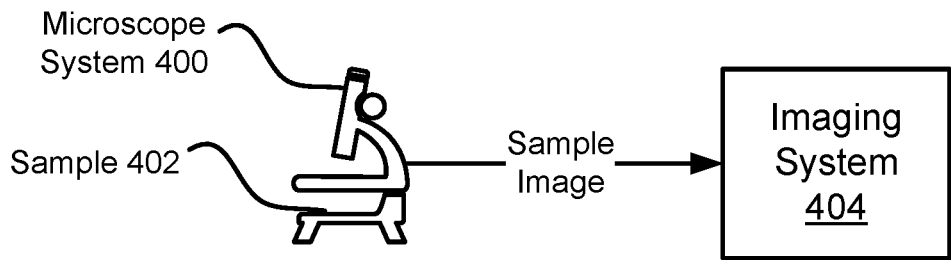
FIGS. 4A-4G show diagrams illustrating a system, operations performed thereby, and data structures used by the system over time in accordance with an embodiment.
Figure 4B:
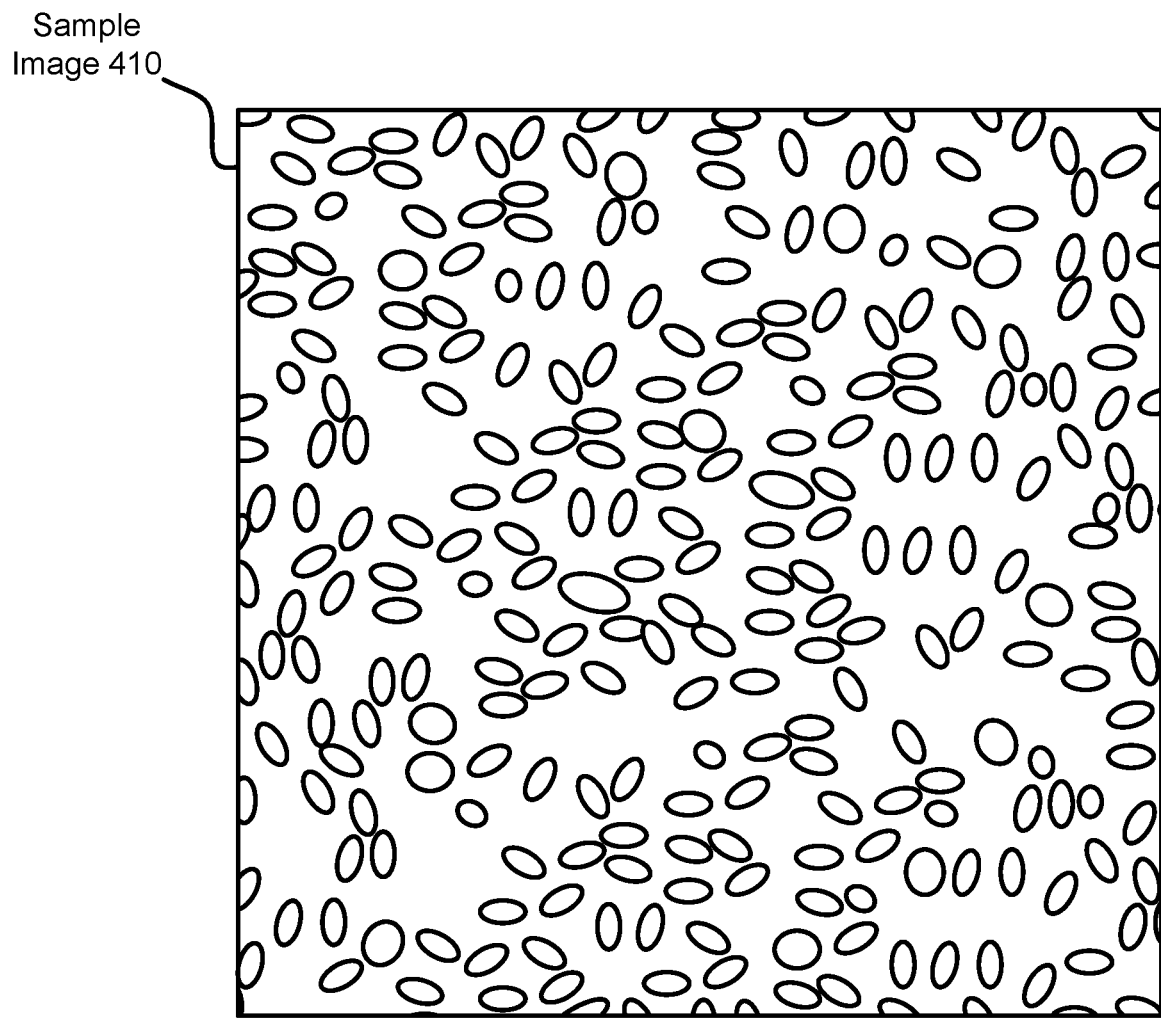
Figure 4C:
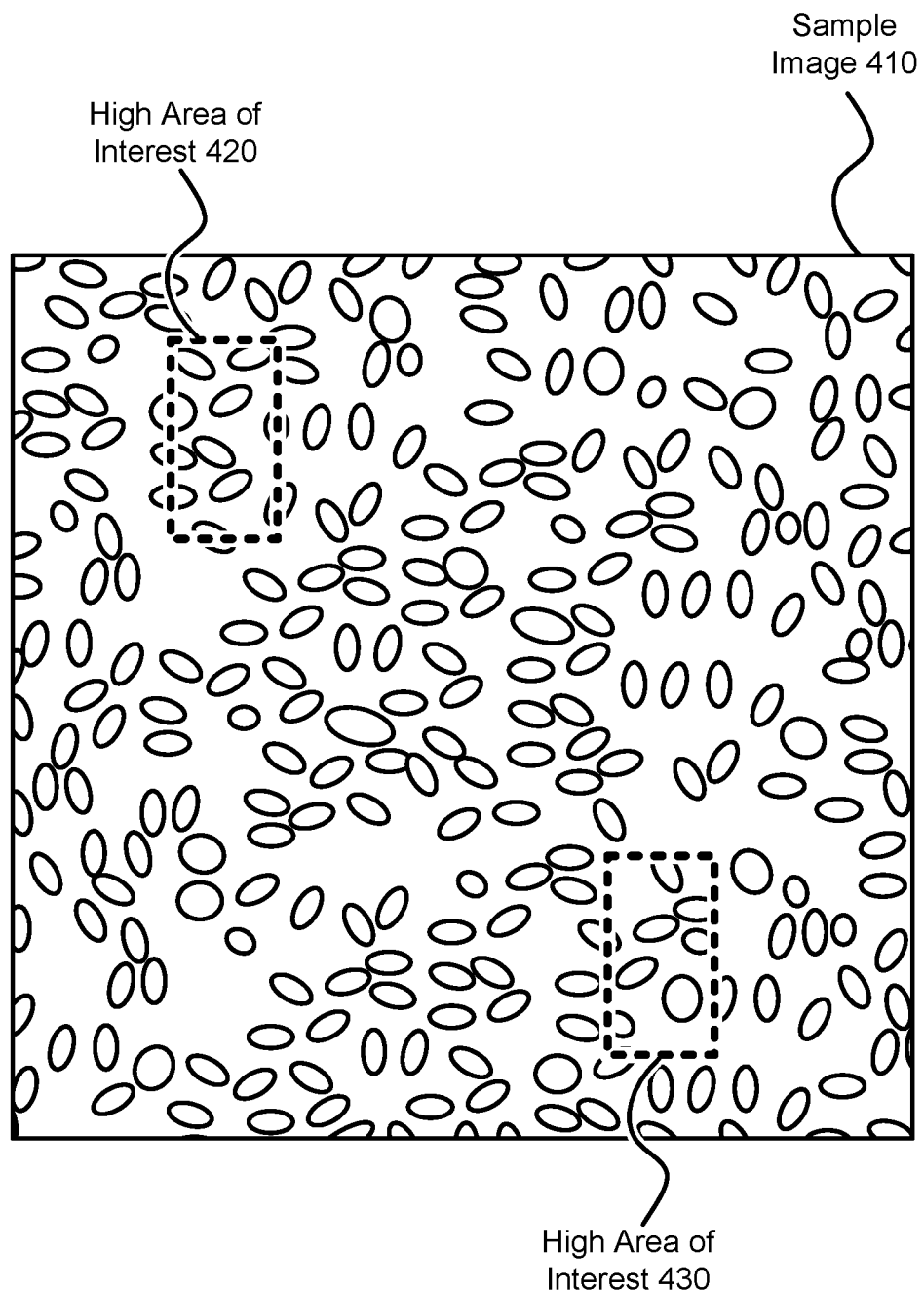
Figure 4D:
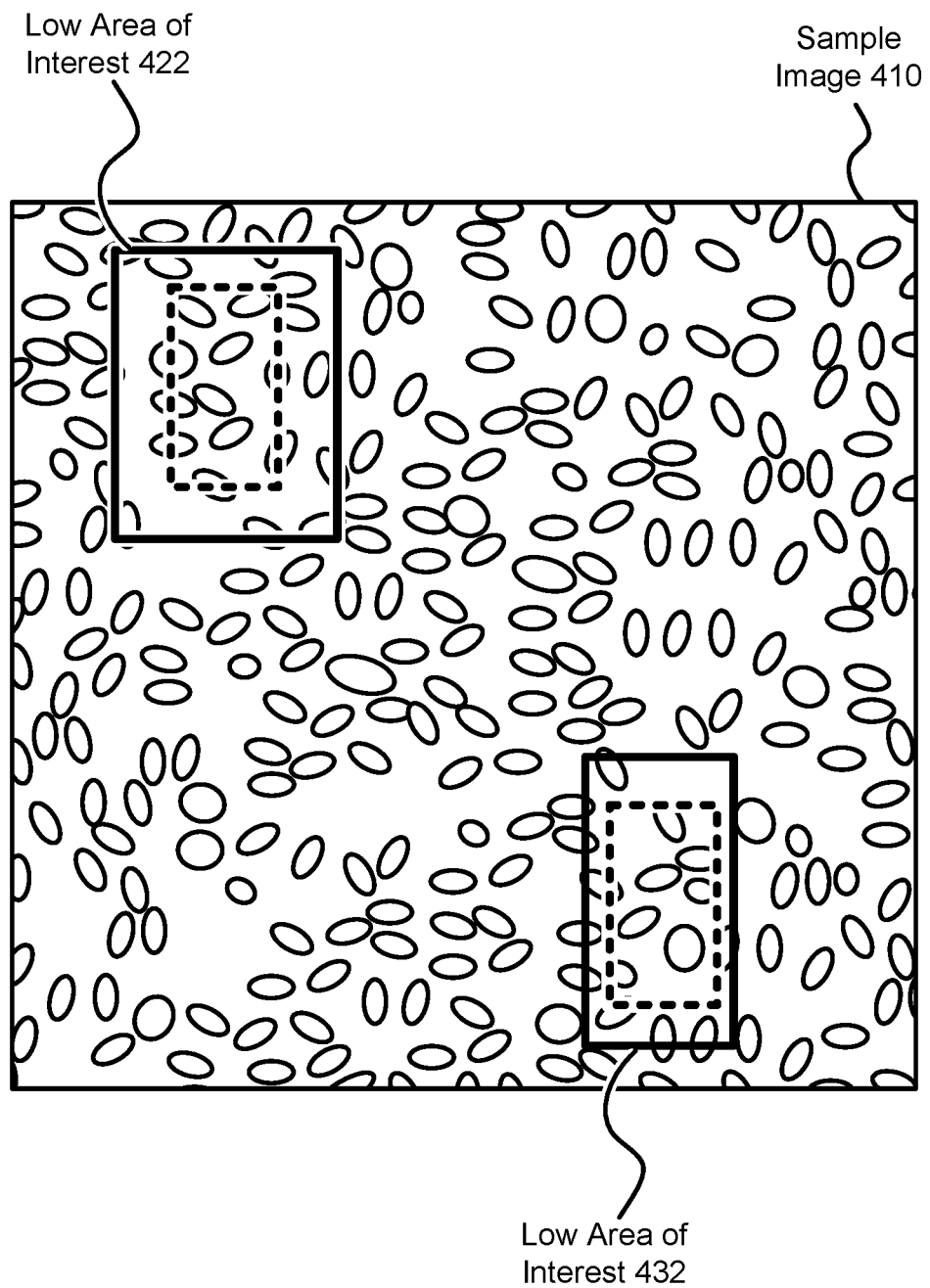
Figure 4E:
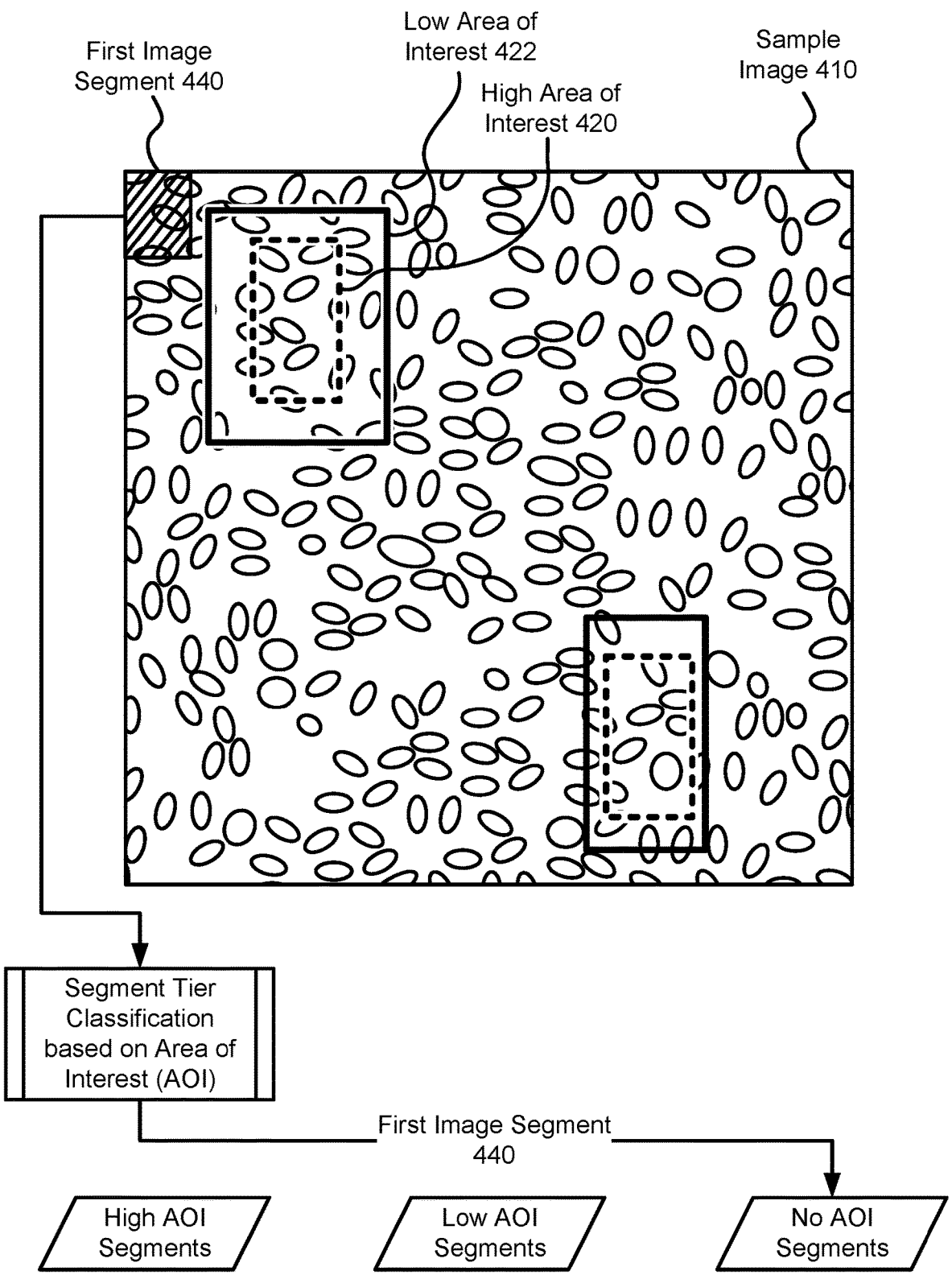
Figure 4F:
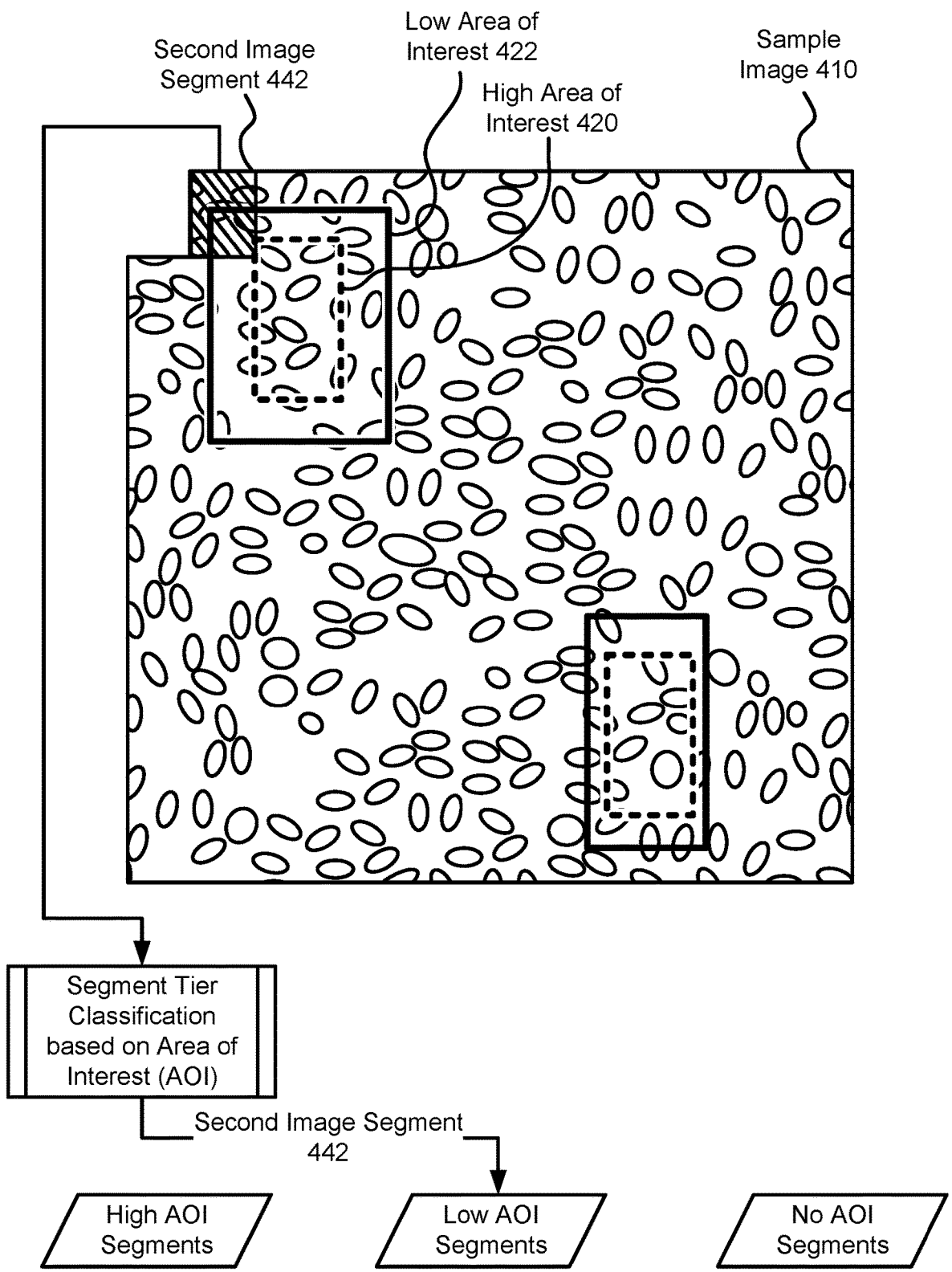
Figure 4G:
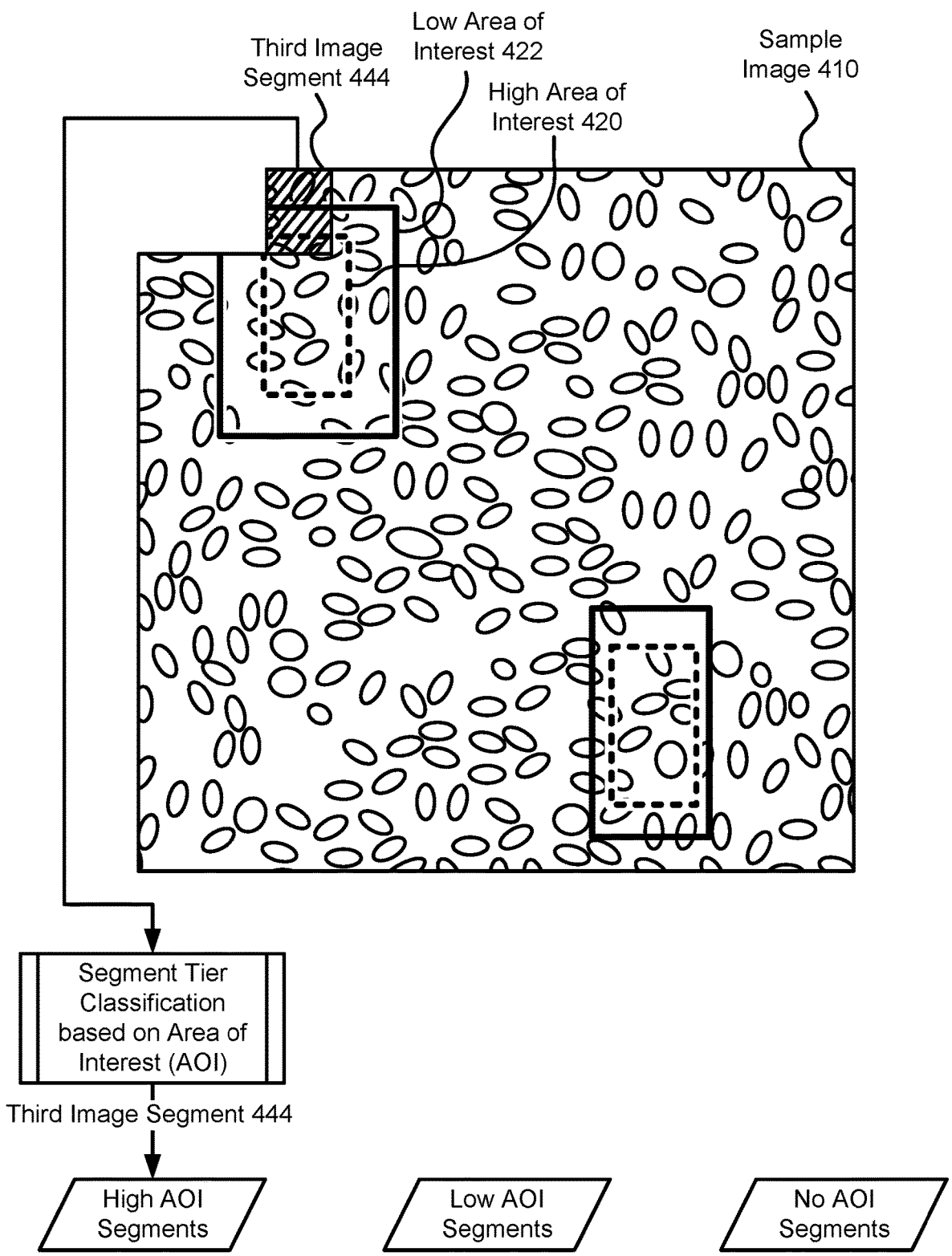

When performing its functionality, one or more of imaging system 100 and tiered storages 102 may perform all, or a portion, of the methods and/or actions shown in FIGS. 3-4G.

Any of imaging system 100 and tiered storages 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with a communication system 101.

In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, communication system 101 is implemented with one or more local communications links (e.g., a bus interconnecting a processor of imaging system 100 and any of the tiered storages).

While illustrated in FIG. 1 as included a limited number of specific components, a system in accordance with an embodiment may include fewer, additional, and/or different components than those illustrated therein.

Figure 2:
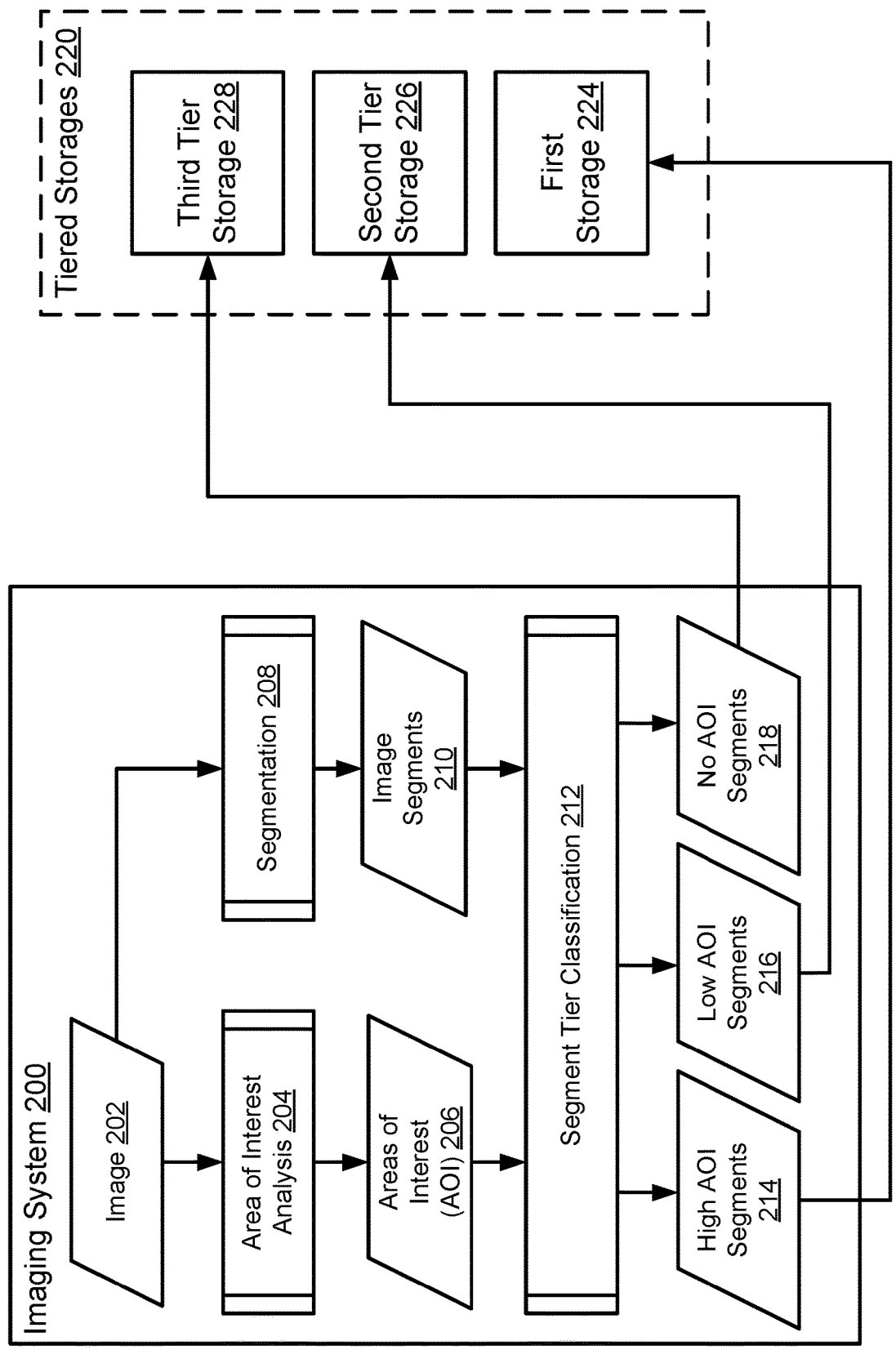
FIG. 2 shows a diagram illustrating data flow and processes performed by a system in accordance with an embodiment.

Turning to FIG. 2, a data flow diagram in a system similar to that illustrated in FIG. 1 in accordance with an embodiment is shown. Imaging system 200 may be similar to imaging system 100, and tiered storages 220 may be similar to tiered storage 102.

Imaging system 200 may obtain image 202. Image 202 may be a data structure including information regarding a scene. For example, image 202 may be any type of image file. The image file may include lossy or lossless compression, may be of any family type (e.g., raster, vector, etc.) or a hybrid, and may include any quantity of information regarding a scene. The image file may be of any format (e.g., Joint Photographic Experts Group (JPEG), Tagged Image File Format (TIFF), Portable Network Graphics (PNG), Graphics Interchange Format (GIF), etc.). Image 202 may be obtained by receiving it from another device (e.g., an imaging device such as a camera), reading it from storage, or by generating it using an imaging device.

Imaging system 200 may perform an area of interest analysis 204 and/or segmentation 208 of image 202. These operations may generate data structures used to select storage location(s) for image 202, and/or store image 202.

Area of interest analysis 204 may identify one or more areas of interest 206 in image 202. Areas of interest 206 may correspond to regions (e.g., groups of pixels corresponding to portions of the depicted scene) of image 202. Each of the areas of interest may also be associated with a type reflecting a place within a hierarchy of the areas of interest. In this manner, areas of interest of greater and/or lesser importance may be defined by the type of each of the areas of interest. Area of interest of similar importance may be of the same type.

Segmentation 208 may segment image 202 into any number of image segments 210. Image 202 may be segmented using any method (e.g., dividing into a number of portions with approximately the same quantity of information for different portions of the depicted scene) without departing from embodiments disclosed herein. The boundaries of each of image segments 210 may or may not conform to the boundaries of area of interest 206.

Once obtained, image segments 210 may be subject to segment tier classification 212 processing based on areas of interest 206 corresponding to the image segments. Segment tier classification 212 may classify image segments 210 based on the corresponding areas of interest, and allocate the classified image segments for storage in different storage tiers based on the classification of each image segment.

For example, all image segments associated with areas of interest that are of a high level of importance may be classified as high area of interest segments 214. Similarly, all image segments associated with area of interest that are of a low level of importance may be classified as low are of interest segments 216. In contrast, all image segments that are not associated with any areas of interest may be classified as no area of interest segments 218. These classifications may be used to perform lookups (or other processes) to identify storage tiers for storage of the corresponding image segments. Once identified, the image segments may be allocated for and stored in storages corresponding to the identified storage tiers.

As seen in FIG. 2, all of the image segments classified as high area of interest segments 214 may be stored in first tier storage 224, which may be a high performance but costly storage (e.g., a solid state disk). The image segments classified as low area of interest segments 216 may be stored in second tier storage 226, which may be a moderate performance storage (e.g., a hard disk drive) and of moderate cost. In contrast, all of the image segments classified as no area of interest segments 218 may be stored in third tier storage 228, which may be a low performance but low cost storage (e.g., a tape drive).

By storing the image segments in this manner, the usability of the storage image may be improved while limiting cost for storing the image for subsequent use. For example, if access to the image is required in the future, the segments of the image corresponding to the portion of the scene most likely to be displayed may be stored in higher performance storage thereby facilitate rapid reading of the segments into memory to facilitate display of this portion of the scene on a display and/or subsequent use. In contrast, the image segments of the image corresponding to the portion of the scene that is unlikely to be displayed may be stored in lower performance but cost effective storage to reduce aggregate cost for storing image 202 for subsequent use.

As discussed above, the components of FIG. 1 may perform various methods to manage storage of images to provide a desired level of accessibility while manage cost. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of storing an image in accordance with an embodiment is shown. The method may be performed by an imaging system or another data processing system.

At operation 300, an image is obtained. The image may be obtained by (i) reading the image from storage, (ii) receiving the image from another device, and/or (iii) generating the image (e.g., capturing it) through use of an imaging device such as a camera.

The image may depict a scene. The image may be interpreted through, for example, viewing/analysis by a person and/or automated analysis via an inference model or other computer implemented process. The image may depict, for example, a group of cells and/or other human tissues, a manufacturing process, an accident scene, a construction site, and/or any other type of scene for which derived information based on the depicted scene may be desired for various purposes.

In an embodiment, the image is a super resolution image. For example, the image may include large amounts of information and may require gigabytes of storage space for storage.

At operation 302, area of interest in the image are identified. The areas of interest may be identified (i) by reading them from storage (e.g., if they already exist) and/or (ii) through automated and/or person-driven analysis of the image. The automated analysis may be performed with an inference model (e.g., which may be treated as a subject matter expert) that may take the image as input and output the areas of interest. The person-driven analysis may be performed by displaying portions of the image to a person (e.g., a subject matter expert) for review and receiving input from the user indicating the areas of interest.

The areas of interest may be part of a hierarchical system that defines some of the areas of interest as being higher or lower in the hierarchy. For example, areas of interest more critical to an outcome of a process through which the areas of interest are identified may be higher in the hierarchy while other areas of interest less critical to the outcome of the process may be lower in the hierarchy. Any number of areas of interest at any level within the hierarchy may be identified for the image.

For example, in the context of a medical image, the process may be a diagnosis of a medical condition. A subject matter expert may review the medical image as part of the diagnosis and may identify the areas of interest, which may be of greater or lesser relevancy to the medical diagnosis made by the subject matter expert. Consequently, if a second subject matter expert reviews the medical image, it may be likely that the second subject matter expert may only review the identified areas of interest (or only a subset of the areas of interest) to double check or otherwise verify a previously made diagnosis, or use the medical image for other purposes (e.g., research). Refer to FIGS. 4A-4D for additional information regarding areas of interest.

At operation 304, the image is segmented into segments. The image segments may be portions of the image. The image segments may be similar or different amounts of the image. Refer to FIGS. 4E-4G for additional information regarding image segments.

At operation 306, the image segments are classified based on the areas of interest to obtain image segment classifications. The image segments may be classified based on their membership in the areas of interest. An image segment may be a member of an area of interest if the image segment includes of a portion of the image that lies within a boundary that defines the area of interest. The memberships in the areas of interest may of an image segment may be used to calculate a value representative of a likelihood of the image segment being accessed in the future. The value may be used to classify the image segment into one of any number of groups (e.g., a high relevance group, medium relevance group, low relevance group, etc.) of image segments. The aforementioned process may be repeated for each image segment to classify each of the image segments.

At operation 308, a storage tier allocation for each of the image segments is obtained. The storage tier allocation for each of the image segments may be based on a corresponding image segment classification for the respective image segment. For example, a lookup (or other process) may be performed based on the corresponding image segment classification to identify the storage tier allocation for each image segment. The storage tier allocation may, for example, indicate where an image segment is stored, provide a plan for managing storage of the image segment (e.g., levels of redundancy, migration plans, etc.), a resolution or other information regarding the fidelity of the image segment, and/or may provide other information regarding storage of the image segment. A storage tier allocation for each segment may be obtained.

At operation 310, each of the image segments is stored in a storage of a storage tier based on the corresponding storage tier allocation. The image segments may be stored by providing the image segments to the respective storages and/or instructions to store the image segments in the corresponding storages. The copies of the image segments provided to the storage may be performed to the fidelity levels and/or other information specified in the storage allocation.

For example, the storage tier allocation for image segments that are not associated with areas of interest may indicate that these image segments are to be stored in a reduced resolution format (or at a prescribed level of fidelity). In this manner, both the cost for the storage tier and the quantity of resources of the storage tier used to store an image segment may be scaled based on the relative importance of each image segment.

Additionally, in some embodiments, the storage tier allocation for the image segments may specify a level of redundancy such that, depending on the image segment classifications: (i) full or low fidelity copies of image segments may be stored in archival storage tiers, (ii) lower fidelity copies of the image segments may be stored in lower tiered storage, and/or (iii) full or high fidelity copies of the image segments may be stored in higher tiered storage.

The method may end following operation 310.

Using the method illustrated in FIG. 3, embodiments disclosed herein may provide a system that stores images in a manner that allows some portions of the image relevant to previously uses of the image to be more quickly accessed and other portions to be stored in lower cost storages that may limit the rate at which these other portions of the image may be accessed. In this manner, the operation of a data processing system that may use the image may appear to its user to be of higher capability than the data processing system's actual capability through selective storage of portions of the image in higher performance storage.

Turning to FIGS. 4A-4G, diagrams illustrating a process of storing an image in accordance with an embodiment are shown.

Turning to FIG. 4A, consider a scenario in which a medical image of sample 402 useful for medical diagnosis purposes is obtained using microscope system 400, which may include a camera and some number of lenses uses to project a depiction of sample 402 on a capture device of the camera. The sample image may be obtained by imaging system 404, which may be similar to the imaging system illustrated in FIG. 1.

Turning to FIG. 4B, a diagram of sample image 410 in accordance with an embodiment is shown. Sample image 410 may be complex and include many features regarding a scene. For example, sample 402 may be a tissue sample from a person. In FIG. 4B, the circles within the border of sample image 410 may represent portions of the image corresponding to cells, proteins, and/or other portions of the tissue. To perform a medical diagnosis, the content and structure of these cells, proteins, and/or other portions of the tissue may be analyzed by a subject matter expert. As part of that analysis, the subject matter expert may identify a range of areas of interest of the image contributing to a final medical diagnosis. For example, certain formations of cells may indicate the presence of cancer or other illnesses.

Turning to FIG. 4C, a second diagram of sample image 410 including annotations reflecting areas of interest in accordance with an embodiment is shown. A seen in FIG. 4C, the subject matter expert may identify high areas of interest 420, 430 within sample image 410. These areas of interest may be explicitly designated by the subject matter expert. In FIG. 4C, the areas of interest are indicated by rectangles with dashed borders. As seen, the areas of interest may designate certain portions of the depicted scene (e.g., collections of cells) as being of high relevance to the diagnosis made by the subject matter expert using sample image 410. However, the subject matter expert may also identify areas of interest at different levels within a hierarchy of the areas of interest.

Turning to FIG. 4D, a third diagram of sample image 410 including annotations reflecting areas of interest at varying levels within a hierarchy in accordance with an embodiment is shown. As seen in FIG. 4D, the subject matter expert may identify low areas of interest 422, 432. These low areas of interest may include the portions of sample image outside of the high areas of interest designed by the rectangles with dashed outline and within the rectangles with solid outline. Like the high areas of interest, low areas of interest 422, 432 may be explicitly designated by the subject matter expert.

As seen in FIG. 4D, the low areas of interest may designate certain portions of the depicted scene (e.g., areas adjacent to collections of cells) as being of lower relevance to the diagnosis made by the subject matter expert using sample image 410.

To ascertain how to store sample image 410, imaging system 404 may perform the method illustrated in FIG. 3. To do so, imaging system 404 may segment and allocate the image segments for storage purposes.

Turning to FIG. 4E, a fourth diagram of sample image 410 including a designation of an image segment in accordance with an embodiment is shown. As seen in FIG. 4E, imaging system 404 may segment sample image 410 to obtain first image segment 440. In FIG. 4E, first image segment 440 includes the portion of sample image 410 defined by the rectangle with lined infill. First image segment 440 may be subjected to segment tier classification based on areas of interest associated with first image segment 440. As seen in FIG. 4E, first image segment 440 is not associated with any areas of interest (e.g., the first image segment includes only portions of sample image 410 outside of all of the areas of interest). Thus, first image segment 440 may be classified as a no area of interest image segment.

Turning to FIG. 4F, a fifth diagram of sample image 410 including a second image segment designation in accordance with an embodiment is shown. As seen in FIG. 4F, imaging system 404 may continue to segment sample image 410 to obtain second image segment 442. In FIG. 4F, second image segment 442 includes the portion of sample image 410 defined by the rectangle with lined infill (e.g., rotate when compared to the infill of the rectangle that defines first image segment 440). Second image segment 442 may be subjected to segment tier classification based on areas of interest associated with second image segment 442. As seen in FIG. 4F, second image segment 442 is associated with the low area of interest 422 (e.g., includes some of sample image 410 that falls within low area of interest 422). Thus, second image segment 442 may be classified as a low area of interest image segment.

Turning to FIG. 4G, a sixth diagram of sample image 410 including a third image segment designation in accordance with an embodiment is shown. As seen in FIG. 4G, imaging system 404 may continue to segment sample image 410 to obtain third image segment 444. In FIG. 4G, third image segment 444 includes the portion of sample image 410 defined by the rectangle with lined infill. Third image segment 444 may be subjected to segment tier classification based on areas of interest associated with third image segment 444. As seen in FIG. 4G, second image segment 442 is associated with the low area of interest 422 and high are of interest 420 (e.g., includes some of sample image 410 that falls within high area of interest 420). Thus, third image segment 44 may be classified as a low area of interest image segment.

This processes may be repeated for each of the image segments of sample image 410. The classifications may then be used to obtain a storage tier designation for each of the image segments, which may be used to drive storage of the image segments.

By doing so, embodiments disclosed herein may provide a system that efficiently marshals limited available computing resources for storage of images in a manner that facilitates improved performance for subsequent use of the images while limiting cost for storing the images.

Figure 5:
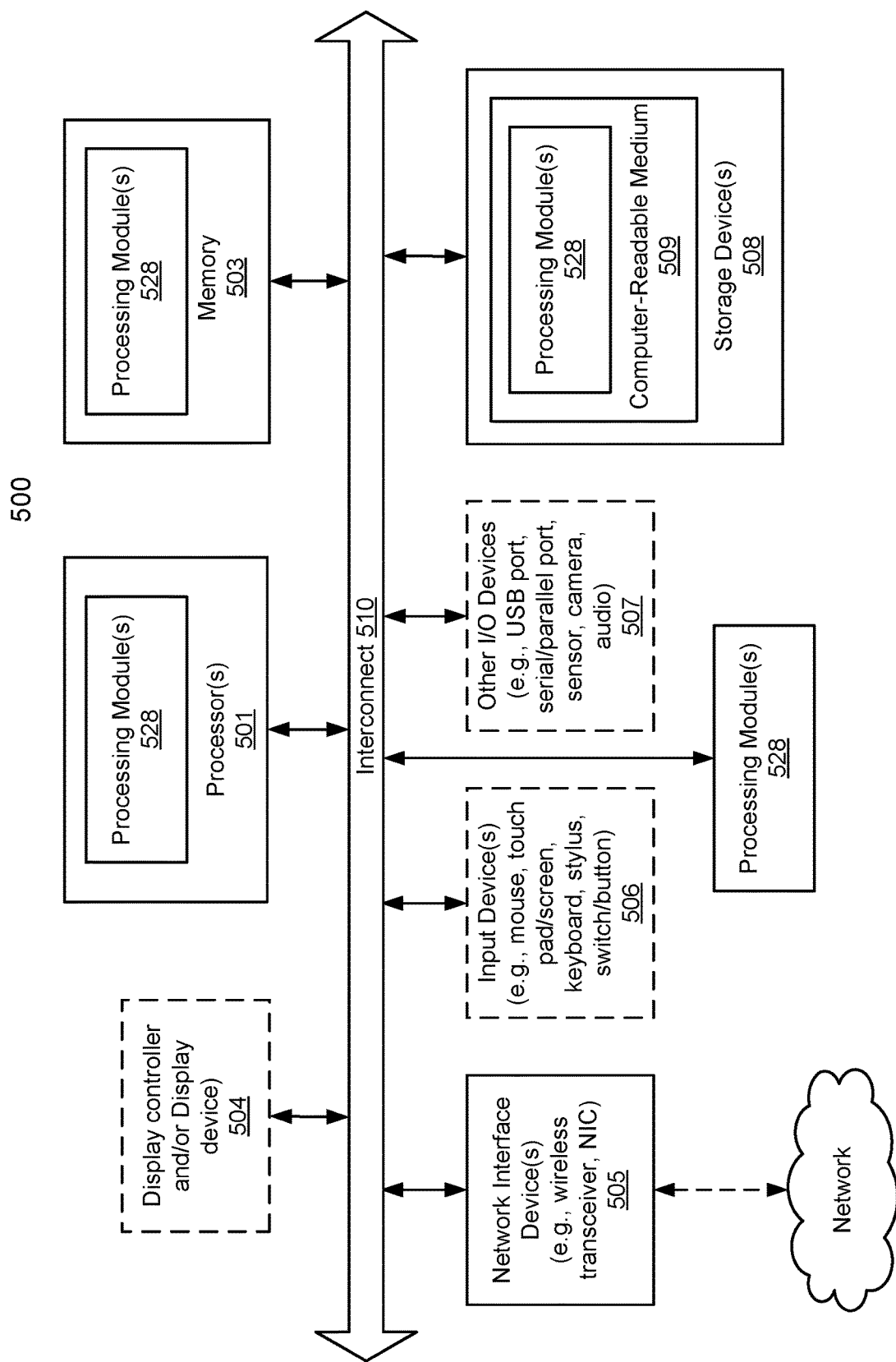
FIG. 5 shows a block diagram illustrating a data processing system in accordance with an embodiment.

Any of the components illustrated in FIGS. 1-4G may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft°, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing storage of images in different storage tiers, the method comprising:
   obtaining an image of the images;
   identifying areas of interest in the image;
   segmenting the image into segments to obtain image segments;
   classifying the image segments based on the areas of interest in the image to obtain image segment classifications corresponding to the image segments comprises at least, for an image segment of the image segments:
      determining a first quantity of the image segment that falls within the areas of interest in the image and classifying the first quantity as a first portion of the image segment;
      determining a second quantity of the image segment that falls outside of the areas of interest in the image and classifying the second quantity as a second portion of the image segment; and
      obtaining an access likelihood value for the image segment by at least multiplying a size of the first portion by a first weight associated with the areas of interest and treating the second portion as having no value, wherein an image segment classification of the image segment is based on the access likelihood value and the image segment classification being one of the image segment classifications;
   obtaining a storage tier allocation for each of the image segments on a corresponding image segment classification of the image segment classifications to obtain storage tier allocations; and
   for each of the image segments, storing the image segment in a storage of a storage tier of the storage tiers, the storage tier of the storage tiers being based on a storage tier allocation of the storage tier allocations associated with the image.

2. The method of claim 1, wherein each of the areas of interest in the image define a group of pixels of the image that are diagnostically relevant to a medical condition.

3. The method of claim 2, wherein each of the areas of interest in the image are identified as part of a medical investigation into the medical condition, the medical investigation being performed by a subject matter expert.

4. The method of claim 3, wherein the subject matter expert is an inference model or a medical professional.

5. The method of claim 1, wherein storing the image segment in the storage comprises:
   identifying an image fidelity level associated with the storage tier of the storage tiers;
   conforming the image segment to the image fidelity level to obtain a conformed image segment; and
   storing the conformed image segment in the storage.

6. The method of claim 5, wherein each of the storage tiers has an associated image fidelity level.

7. The method of claim 1, wherein each of the areas of interest in the image are identified as part of a medical investigation into the medical condition, the medical investigation being performed by a subject matter expert.

8. A non-transitory machine-readable medium having instructions stored therein, which when executed by a processor, cause the processor to perform operations for managing storage of images in different storage tiers, the operations comprising:
 obtaining an image of the images;
 identifying areas of interest in the image;
 segmenting the image into segments to obtain image segments;
 classifying the image segments based on the areas of interest in the image to obtain image segment classifications corresponding to the image segments comprises at least, for an image segment of the image segments:
  determining a first quantity of the image segment that falls within the areas of interest in the image and classifying the first quantity as a first portion of the image segment;
  determining a second quantity of the image segment that falls outside of the areas of interest in the image and classifying the second quantity as a second portion of the image segment; and
  obtaining an access likelihood value for the image segment by at least multiplying a size of the first portion by a first weight associated with the areas of interest and treating the second portion as having no value, wherein an image segment classification of the image segment is based on the access likelihood value and the image segment classification being one of the image segment classifications;
 obtaining a storage tier allocation for each of the image segments on a corresponding image segment classification of the image segment classifications to obtain storage tier allocations; and
 for each of the image segments, storing the image segment in a storage of a storage tier of the storage tiers, the storage tier of the storage tiers being based on a storage tier allocation of the storage tier allocations associated with the image.

9. The non-transitory machine-readable medium of claim 8, wherein each of the areas of interest in the image define a group of pixels of the image that are diagnostically relevant to a medical condition.

10. The non-transitory machine-readable medium of claim 9, wherein each of the areas of interest in the image are identified as part of a medical investigation into the medical condition, the medical investigation being performed by a subject matter expert.

11. The non-transitory machine-readable medium of claim 10, wherein the subject matter expert is an inference model or a medical professional.

12. The non-transitory machine-readable medium of claim 8, wherein storing the image segment in the storage comprises:
 identifying an image fidelity level associated with the storage tier of the storage tiers;
 conforming the image segment to the image fidelity level to obtain a conformed image segment; and
 storing the conformed image segment in the storage.

13. The non-transitory machine-readable medium of claim 8, wherein each of the storage tiers has an associated image fidelity level.

14. A data processing system, comprising:
 a processor; and
 a memory coupled to the processor to store instructions, which when executed by the processor, cause the processor to perform operations for managing storage of images in different storage tiers, the operations comprising:
  obtaining an image of the images;
  identifying areas of interest in the image;
  segmenting the image into segments to obtain image segments;
  classifying the image segments based on the areas of interest in the image to obtain image segment classifications corresponding to the image segments comprises at least, for an image segment of the image segments:
   determining a first quantity of the image segment that falls within the areas of interest in the image and classifying the first quantity as a first portion of the image segment;
   determining a second quantity of the image segment that falls outside of the areas of interest in the image and classifying the second quantity as a second portion of the image segment; and
   obtaining an access likelihood value for the image segment by at least multiplying a size of the first portion by a first weight associated with the areas of interest and treating the second portion as having no value, wherein an image segment classification of the image segment is based on the access likelihood value and the image segment classification being one of the image segment classifications;
  obtaining a storage tier allocation for each of the image segments on a corresponding image segment classification of the image segment classifications to obtain storage tier allocations; and
  for each of the image segments, storing the image segment in a storage of a storage tier of the storage tiers, the storage tier of the storage tiers being based on a storage tier allocation of the storage tier allocations associated with the image.

15. The data processing system of claim 14, wherein each of the areas of interest in the image define a group of pixels of the image that are diagnostically relevant to a medical condition.

16. The data processing system of claim 15, wherein each of the areas of interest in the image are identified as part of a medical investigation into the medical condition, the medical investigation being performed by a subject matter expert.

17. The data processing system of claim 16, wherein the subject matter expert is an inference model or a medical professional.

18. The data processing system of claim 14, wherein storing the image segment in the storage comprises:
 identifying an image fidelity level associated with the storage tier of the storage tiers;
 conforming the image segment to the image fidelity level to obtain a conformed image segment; and
 storing the conformed image segment in the storage.

19. The data processing system of claim 18, wherein each of the storage tiers has an associated image fidelity level.

20. The data processing system of claim 14, wherein each of the areas of interest in the image are identified as part of a medical investigation into the medical condition, the medical investigation being performed by a subject matter expert.

* * * * *